Patented Feb. 25, 1941

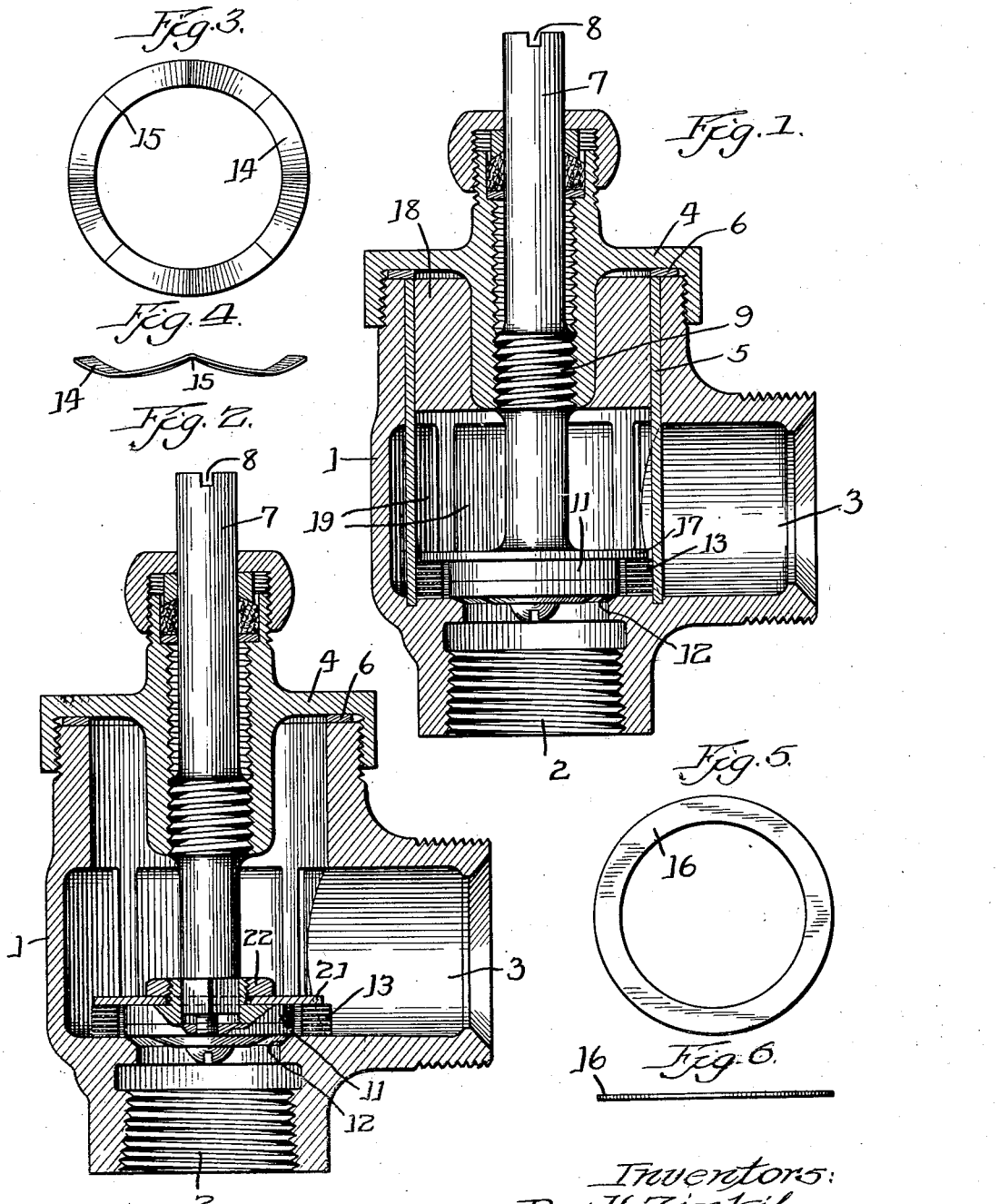

2,233,236

UNITED STATES PATENT OFFICE 2,233,236

VALVE

Roy H. Zinkil, Oak Park, Edward A. Fredrickson, Chicago, and Eugene W. Marchand, Jr., Maywood, Ill., assignors to Crane Co., Chicago, Ill., a corporation of Illinois Application June 10, 1940, Serial No. 339,641

5 Claims. (Cl. 137—111)

This invention relates to a valve and more particularly to a relatively quiet control stop valve in which a positive stop or closure member is utilized in combination with a resilient throttling member and in which the manufacture thereof is relatively simplified so as to avoid the usual need for close tolerances in devices of this type.

An important object of our invention is to provide a valve for use preferably, though not necessarily, on a domestic water pipeline which will serve the dual purpose of completely shutting off the flow of fluid through the pipeline and of silencing the noises inherent in such pipelines when fluid flows therethrough at relatively high velocities in addition to being self-cleaning during the course of operation.

Another object is to provide a valve in which a resilient throttling member, comprising a plurality of laminated annular spring elements, is adjustably mounted with respect to the position of the closure member.

It is recognized that, in general, alleged resilient throttling and silencing members have been previously known and used as evidenced by the United States Patent to Ericson, #1,833,518, for example, but to our knowledge no one has previously devised a compact and economical resilient silencing and throttling member which cooperates directly with the closure member and is in substantial axial alignment therewith to provide a conveniently operable device.

Further objects and advantages of the invention will appear as the following specific descriptions of the various embodiments are read in connection with the accompanying drawing, in which—

Fig. 1 is a vertical sectional view of a valve embodying our invention showing a removable cage for retaining the plurality of laminated annular spring elements or washers comprising the combined silencing and throttling member.

Fig. 2 is a vertical sectional view of a valve similar to Fig. 1 with the exception that the retaining cage is integral with the valve casing and the silencing member compressing element is removable from the closure member.

Fig. 3 is an external plan view of a corrugated or crimped annular spring element used in the silencing member.

Fig. 4 is an external elevation of the element shown in Fig. 3.

Fig. 5 is an external plan view of a flat annular spring element used in the silencing member.

Fig. 6 is an external elevation of the element shown in Fig. 5.

Similar reference characters refer to similar parts throughout the various views of the drawing.

Referring to Fig. 1, the valve body or casing 1 is provided with the usual threaded inlet 2 and the threaded outlet 3 and also has its upper portion threaded to receive the bonnet 4. The body 1 is also provided with a removable ported cylindrical cage 5 which is secured in position within the body by the bonnet 4 bearing against the retaining gasket 6, serving thereby to hold the cage 5 in position. A valve stem 7, having its upper end slotted, as at 8, for operation by a screwdriver or the like, is threaded, as at 9, into the bonnet and is provided at its lower extremity with the closure member 11 which is adapted to bear against the casing seat 12 for the purpose of shutting off the fluid flow through the valve. Preferably surrounding and positioned adjacent to the seat 12 and within the cage 5, a plurality of annular spring elements are placed which aggregatively comprise the throttling and silencing member 13.

As to the detailed construction of these latter elements, attention is now directed to Figs. 3, 4, 5 and 6 in which the spring elements which comprise the throttling and silencing member 13 are shown separately. In Figs. 3 and 4 one type of element 14 is shown which is made preferably of suitable spring material, such as relatively thin metal, having the crimped portions or corrugations 15. Figs. 5 and 6 show another type of element 16 which is preferably made of the same material as the element 14 but which is flat. The assembly of the silencing and throttling member 13 comprises the alternate stacking of a plurality of the elements 14 and 16 one upon the other and inserting the assembled member in the valve with the overhanging flange portion 17 (Fig. 1) of the closure member 11 bearing downwardly upon the uppermost element of the silencing and throttling member 13.

Again referring to Fig. 1, in order to further enhance the silent flow of fluid through the valve, the upper portion of the casing 1 and the cage 5 adjacent to the bonnet 4 may be filled, although not necessarily, with a sound absorbing or damping material 18 such as cork, sponge rubber or the like. The closure member 11, in the position shown, is bearing directly against the seat 12 forming the shut-off for the valve, and the flange 17 which extends radially outwardly over the throttling member 13 is holding the latter member in a compressed position. It is preferable that the member 13 should be compressed substantially, but not completely, to its height when pressed solid in order to avoid impeding the movement of the closure member 11 in reaching its seat.

When the closure member 11 is in the open or partially open position fluid entering the valve through the inlet 2 passes upwardly past the seat 12 after which it is deflected laterally by the lower surface of the closure member 11 through the spaces formed (by reason of the crimped portions 15 tending to expand the assembly constituting the member 13) between the individual elements 14 and 16 of the silencing and throttling member. The cage 5 guides and retains the elements 14 and 16 within the valve body at all positions of the closure member and is provided with the outlet ports 19 to allow the fluid passing through the silencing member to continue through the valve and to discharge through the outlet 3. Thus when the closure member 11 is in a throttled or slightly opened position, so as to permit a reduced flow past the seat 12, the respective spaces between each of the elements 14 and 16 are increased thus allowing fluid flow therebetween resulting in a relatively hushed flow through the valve.

Attention is now directed to Fig. 2 showing a valve similar to that shown in Fig. 1 with the exceptions that the cage 5 is made integral with the casing 1 and the sound damping material 18 is omitted. Also, the compression member 21 is made separate from and detachably secured to the closure member 11. Under certain service conditions, instead of having an integral flange, such as 17 in Fig. 1, an advantage may be gained by providing the relatively flexible annular compression member 21 adjustably secured to the upper surface of the closure member 11 by the nut 22. In the event that foreign particles become lodged in the spaces between the elements 14 and 16 when the valve is open, the closure member 11 may nevertheless be lowered to the seat 12 by reason of the upwardly directed flexing of the member 21 after the silencing member 13 has reached a height when pressed solid. The manner of operation of the valve is identical to that of the valve shown and described in connection with Fig. 1.

Attention is directed to the fact that valves presently available have the undesirable tendency to be cut and worn away at the seating surfaces of the closure member by reason of fluid flowing therepast at high velocities when the valve is in the throttled position. Our invention substantially eliminates any cutting or wearing action at the seating surfaces because as the closure member approaches its seat the throttling and silencing member increasingly restricts the flow through the valve. Also, inasmuch as the silencing and throttling member has a relatively large opening or openings, the fluid passing therethrough has a comparatively low velocity and the tendency to cut and to erode the surfaces is substantially eliminated.

While we have shown and described various preferred embodiments of our invention, it is obvious to those skilled in the art that further modifications may readily be made. Therefore, we wish to be limited only by the scope of the appended claims.

We claim:

1. A valve comprising a casing having an inlet and an outlet, a closure member, a throttling and silencing member, the said latter member comprising one or more annularly disposed flexible elements surrounding the said closure member and compressible by the said closure member whereby flow through the said valve is throttled and silenced.

2. A valve comprising a casing having an inlet and an outlet, a closure member for the said inlet, sound absorbing material within the said casing, a combined throttling and silencing member within the said casing surrounding and in substantial axial alignment with the said closure member, the said throttling and silencing member comprising one or more annularly disposed flexible elements defining passageways for the flow of fluid through the said valve, the said closure member being capable of adjustably positioning the said throttling and silencing member to vary the size of the said passageways.

3. A valve comprising a casing having an inlet and an outlet, a closure member for the said inlet, a combined throttling and silencing member within the said casing surrounding and in substantial axial alignment with the said closure member, the said throttling and silencing member comprising a plurality of superposed washer-like means forming annular passages for fluid flow through the said valve, the said washer-like means being adjustably positionable relative to the said closure member upon movement of said latter member.

4. In a valved silencing and throttling device, comprising a casing having an inlet and an outlet, a seat at the said inlet, a surface portion surrounding the said seat, closure means for the said inlet comprising respectively a positive closure member for the said seat and a resilient throttling member for the said surface portion, the said throttling member comprising annularly disposed stacked members adapted to bear with varied degrees of resiliency against the said surface portion upon longitudinal movement of the said closure member relative to its seat.

5. In a valved silencing and throttling device, comprising a casing having an inlet and an outlet, a seat adjacent the said inlet, an annular surface portion surrounding the said seat, closure means for the said inlet comprising respectively a positive closure member for the said seat and a resilient throttling member, the latter normally engaging the said surface portion, the said throttling member comprising a plurality of superposed relatively thin undulated disc-like members positioned circumferentially relative to the said seat and each being independently movable axially relative to the said surface portion upon predetermined positioning of the said closure member during the course of opening or closing the valve.

ROY H. ZINKIL.
EDWARD A. FREDRICKSON.
EUGENE W. MARCHAND, Jr.